F. L. MacKENZIE.
STARTING AND STOPPING MECHANISM.
APPLICATION FILED JUNE 2, 1911.
1,072,630.
Patented Sept. 9, 1913.
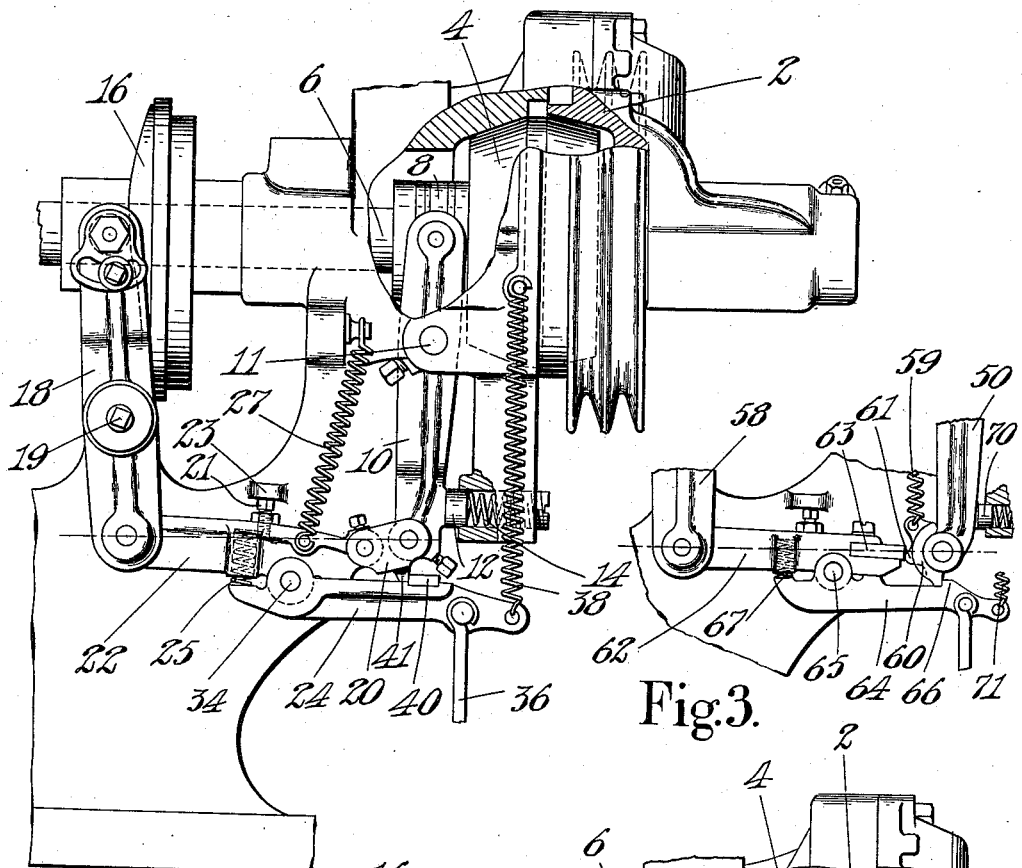
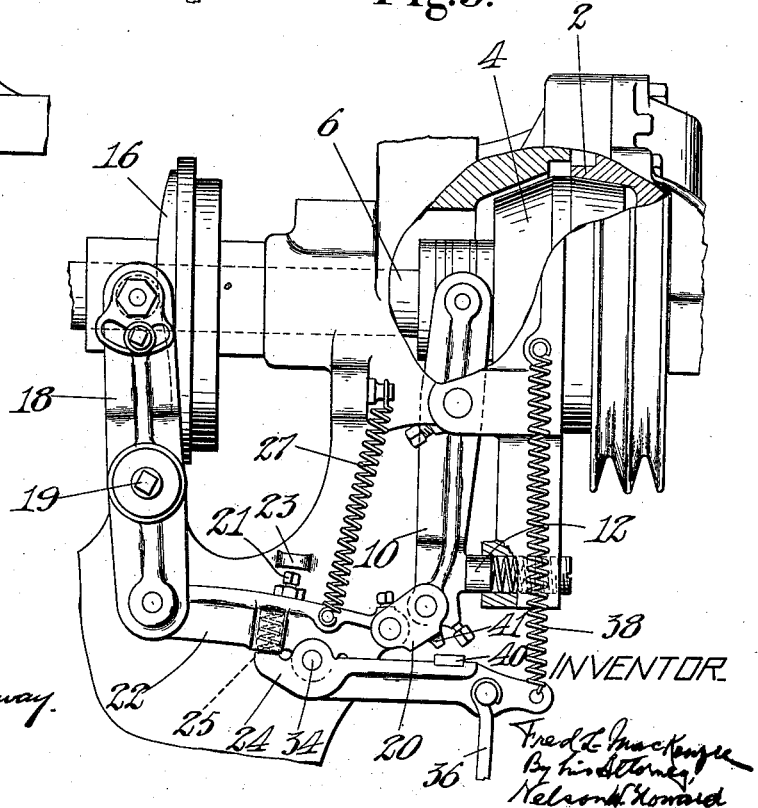
Fig. 1.
Fig. 2.
Fig. 3.
WITNESSES
Herbert W. Kenway
Elizabeth C. Coupe
INVENTOR
Fred L. Mackenzie
By his Attorney
Nelson Howard
COLUMBIA PLANOGRAPH CO., WASHINGTON, D. C.

UNITED STATES PATENT OFFICE.

FRED L. MacKENZIE, OF BEVERLY, MASSACHUSETTS, ASSIGNOR TO UNITED SHOE MACHINERY COMPANY, OF PATERSON, NEW JERSEY, A CORPORATION OF NEW JERSEY.

STARTING AND STOPPING MECHANISM.

1,072,630. Specification of Letters Patent. Patented Sept. 9, 1913.

Application filed June 2, 1911. Serial No. 630,818.

*To all whom it may concern:*

Be it known that I, FRED L. MACKENZIE, a citizen of the United States, residing at Beverly, in the county of Essex and State of Massachusetts, have invented certain Improvements in Starting and Stopping Mechanisms, of which the following description, in connection with the accompanying drawings, is a specification, like reference characters on the drawings indicating like parts in the several figures.

This invention relates to starting and stopping mechanisms and pertains more particularly to that type of mechanism wherein a clutch is disengaged at a predetermined point in the cycle of operations of a machine by a clutch-thrower, the action of which is communicated to the clutch through appropriate transmission devices. Commonly a machine employing such mechanism is started by interrupting effective communication through the transmission devices so as to render the action of the clutch thrower ineffectual and at the same time to permit a spring or other clutch engaging devices to act; and the machine is stopped by reëstablishing effective communication through the transmission devices so that the ensuing action of the clutch-thrower is transmitted to the clutch and disengages it. This type of starting and stopping mechanism is employed with particular advantage in connection with machines which it is desired to stop with their operating parts always in a predetermined position, and in such use it is especially important that the machine be stopped promptly and accurately at the proper time in order to preclude overrunning beyond the position desired for the operating parts when they come to rest.

This invention is designed to provide for stopping a machine promptly and accurately by locking the transmission devices securely in position when effective communication through them has been established, thereby preventing a momentary disarrangement of said devices frequently experienced in machines heretofore used, which is likely to interrupt communication again and allow the machine to overrun and injure the stock being operated upon, besides leaving the machine parts in inconvenient and undesired positions.

To this end, the invention comprises the combination of a clutch, and a clutch-thrower with improved transmission devices and an improved type of locking means arranged to lock the transmission devices in position to communicate the action of the clutch-thrower to the clutch.

As herein shown there are interposed between the clutch-thrower and the clutch two transmission pieces pivoted at their outer ends respectively to the clutch-thrower cam lever and the clutch shifting lever. The pivoted pieces are adapted to be locked rigidly in such position that the point of contact or connection of their adjacent ends is out of line with the pivot points of their outer ends, and in such condition the pivoted pieces are moved bodily to shift the friction member of the clutch. When it is desired to interrupt the effective communication through the transmission pieces they are unlocked and permitted to move, or are moved, farther out of alinement with each other.

That feature of the invention which consists in utilizing pivoted transmission pieces held in an unalined position is of much importance in that only movement of slight extent and the application of little pressure are required to move these pieces from their slightly unalined transmitting position into ineffective condition. This facilitates ready starting and stopping of the machine with little effort on the operator's part which is most desirable, especially in eyeleting machines or the like which must be started and stopped a great number of times in a day's run.

One preferred type of locking device for holding the pivoted pieces in their transmitting position consists in a latch or dog movably mounted on one of said pieces and arranged to engage with the other and prevent relative angular movement of the pieces, holding them so that motion is transmitted through them by endwise movement of the two pieces moving as a single member. A locking device of this character presents the advantage that it is self contained and obviates the necessity of separate bearing plates or the like.

Other features and advantages of the invention will appear from the detailed description of two preferred embodiments thereof and from the claims appended to this specification.

One type of starting and stopping mechanism which has been used heretofore is well illustrated in Letters Patent of the United States No. 672,056, granted April 16, 1901, to J. F. Davey et al., and the present invention will be described for purposes of illustration as embodied in mechanism employing a clutch and clutch-thrower similar to those shown in said patent. The invention, however, is in no sense limited to starting and stopping mechanism of this character but is of general application.

In the accompanying drawings,—Figure 1 is a view in side elevation, partly in section, showing the transmission devices locked in effective position and the clutch disengaged; Fig. 2 is a similar view showing the transmission devices unlocked and the clutch engaged; Fig. 3 is a view in side elevation, of a modified form of transmission mechanism.

The clutch consists of a belt driven pulley 2 and a friction member 4. The pulley is loosely mounted upon a shaft 6 or on an extension thereof and the friction member 4 is keyed or otherwise connected with the shaft to permit axial movement relatively thereto. The friction member 4 has two oppositely disposed frusto-conical friction surfaces one of which, when the clutch is engaged, fits into a correspondingly shaped concave friction surface formed in the pulley 2, and the other of which contacts when the clutch is disengaged with a rigid friction surface on the frame of the machine which serves as a brake to arrest the rotation of the friction member and shaft. The friction member is moved axially on the shaft by a shifting arm 10 pivoted at 11 and connected with a loose collar 8 rotatably mounted on the hub of the friction member. A plunger 12 mounted in a recess in the frame of the machine is urged forward by a spring 14 and when unimpeded holds the shifting arm in position to cause the clutch to engage, that is, to cause the friction member to engage the pulley 2. The action of said spring is opposed for moving the shifting arm to disengage the clutch by the clutch-thrower cam 16 on the shaft 6 and the cam lever 18 pivoted at 19 to the frame of the machine.

The action of the clutch-thrower 16 is communicated to the shifting arm 10 through transmission devices comprising the cam lever 18 and toggle links 20 and 22. When the toggle links are held rigidly against relatively angular movement effective communication is established between the clutch-thrower and the clutch so that the cam 16 will act at the proper time to disengage the clutch, but when the toggle links are permitted to move angularly effective communication is interrupted and, until the toggle links are again rigidly held, the spring 14 will hold the clutch in engagement to drive the shaft. The toggle link 20 is pivoted to the lower end of the shifting arm 10 and the toggle link 22 is pivoted to the lower end of the cam lever 18. A stiff tension spring 27 connected to the link 22 near the toggle joint tends normally to move the stop 21 on the link 22 into engagement with a fixed abutment 23 on the frame of the machine, the stop and abutment being so located that the toggle links are held slightly out of line or in a slightly broken condition. In this position the toggle links are held against relative angular movement and transmit motion from the clutch-thrower cam 16 to the shifting arm by bodily endwise movement. In this movement the stop 21 will slip on the abutment 23.

Locking of the toggle links in effective position is effected by a locking arm 24 pivotally mounted on the link 22 and carrying a hardened block 40 arranged to engage a projecting lug or catch piece 41 on the link 20. The locking arm 24 is normally moved into locking position by a tension spring 38 extending between its outer end and a pin in the casing of the clutch and also by a stiff compression spring 25 located in a socket in the link 22 and bearing against a projection on the arm 24 extending to the left of its pivot 34. It will be seen that the engagement of the block 40 and lug 41 holds the links rigidly against relative angular movement so that the toggle cannot be further broken while this engagement continues. Under these conditions the toggle acts as a rigid bent link between the lever 18 and arm 10. The locking arm 24 is moved to disengage the link 20 by depressing a treadle rod 36 connected to the outer end of the arm. When the arm is moved out of locking position by being turned on its pivot, as shown in Fig. 2, the toggle is free to be broken either by the action of the spring plunger 12 or the downward pull of the treadle rod 36. The plunger 12 thereupon acts to shift the arm 10 and engage the clutch.

The stop 21 is made adjustable so that the angular position of the toggle links for transmitting the clutch-disengaging movement may be adjusted as desired. If there is an appreciable angle between the links the action of the spring plunger 12 will be sufficient to overcome the tension of spring 27 and render the toggle inoperative immediately but if the toggle links are brought nearly into alinement a slight pressure on the toggle may be required to break it further. In the embodiment of the invention herein shown, this is effected by the continued depression of the treadle rod 36. The first part of the movement of the treadle rod carries the block 40 out of engagement with the lug 41 and at the same time compresses the spring 25 until the extension on the locking arm 24 contacts with link 22. Under these conditions the arm 24 forms in effect a rigid continuation of the link 22 so that the further movement of the treadle rod swings this link downwardly thus breaking the toggle. The effective length of the toggle is thus shortened and the cam lever 18 swung about its pivot 19 out of the path of the high part of the cam 16.

In Figs. 1 and 2 there is illustrated transmission mechanism which comprises a pair of links connected at their adjacent ends to form a toggle joint. It is not necessary, however, to connect the transmission links together and in Fig. 3 there is shown an embodiment of the invention in which unconnected transmission members are substituted for the links above described.

In the mechanism shown in Fig. 3, the clutch-thrower cam lever 58 has pivotally connected to its lower end the arm 62 carrying the hardened contact piece 63 and the clutch shifting lever 50 has pivotally connected to its lower end the member 60 having a projecting finger 61. Pivotally connected to the arm 62 is a locking arm 64 having on its outer end a tooth 66 adapted to engage a corresponding tooth on the member 60 and prevent the latter from turning on its pivot. The locking arm is normally held in locking engagement with member 60 by a compression spring 67 acting on an extension of the arm and also by a tension spring 71 acting to lift the outer end of the arm. When the arm 62 and the member 60 are held in their transmitting position by springs 71 and 59 respectively, the piece 63 and the finger 61 are in contact at a point below the line of the pivot points of the arm 62 and member 60. They are held rigidly in this unalined condition by the engagement of the locking arm 64 with the tooth on the member 60. The lever 50 is subjected to the action of the spring plunger 70 which, if free to act, would swing the lever to the left in Fig. 3 causing the clutch to engage. The action of the spring is overcome by the clutch-thrower acting through the transmission arm 62 and member 60, the latter being moved bodily endwise to disengage the clutch. In Fig. 3 the parts are represented as in their positions after the movement of the clutch-thrower has been transmitted to disengage the clutch.

When it is desired to render the transmission mechanism ineffective and permit the clutch to engage the locking arm 64 is swung downwardly by depressing a treadle rod connected thereto and the tooth on the member 60 released. The spring plunger immediately forces the lever 50 toward the left, the member 60 turning against the tension of the spring 59. The arm 62 also swings downwardly about its pivot either on account of the unbalanced pressure of the member 60 or by reason of a continued downward movement of the treadle rod. When the member 60 has turned a short distance the contact piece 63 slips off the projecting finger 61 and the member 60 is returned to its initial position by the spring 59 while the arm 62 is free to reciprocate idly beneath the finger 61. After the machine has made the desired number of cycles the treadle rod is released and the arm 62 permitted to rise against its fixed stop and on the following actuation of the clutch-thrower cam the clutch is disengaged the parts again returning to the positions shown in Fig. 3.

It will be seen that the movement of the locking arm 64 or 24 required to unlock the transmission pieces is very slight and that there is but little friction to overcome in effecting this operation so that only a light pressure on the treadle is necessary. Moreover, since the pieces are already in an unalined condition and subjected to endwise pressure by the spring plunger 70 or 12 there will be practically nothing but the tension of the spring 71 or 27 to overcome in moving the pieces into a further unalined position to render them inoperative.

In the specification and claims the term "pieces" has been used in a generic sense to cover the toggle links, or the arm 62 and the member 60, or any other transmission pieces operating in the combinations above disclosed.

Having described my invention, what I claim as new and desire to secure by Letters Patent of the United States is:—

1. Starting and stopping mechanism having, in combination, a clutch, means for engaging the clutch, an automatically acting clutch-thrower, transmission devices having a hinged connection, and locking means connected permanently to the transmission devices at one side of said hinged connection and arranged to be brought into engagement with said devices temporarily at the other side of the hinged connection for automatically locking the transmission devices in position to communicate the action of the clutch-thrower to the clutch.

2. Starting and stopping mechanism having, in combination, a clutch, means for engaging the clutch, a clutch-thrower, articulated transmission devices, locking means mounted on one of said devices for engaging the other device and locking the transmission devices in position to communicate the action of the clutch-thrower to the clutch; and a controller arranged to act on said transmission devices.

3. Starting and stopping mechanism having, in combination, a clutch, clutch-engaging means, a clutch-thrower, transmission means including a toggle, and a latch on one toggle link arranged to be detachably connected with the other toggle link for locking said toggle in a broken condition to transmit the action of the clutch-thrower to the clutch.

4. Starting and stopping mechanism having, in combination, a clutch, a clutch-thrower, transmission means between said clutch-thrower and clutch including toggle links, and a latch on one link arranged to be detachably connected to the other link for holding said toggle links in a broken condition to transmit the action of the clutch-thrower to the clutch.

5. Starting and stopping mechanism having, in combination, a clutch, a clutch-thrower, relatively movable transmission pieces between said clutch and clutch-thrower, a latch for engaging the transmission pieces at separate points to hold them so that they may be moved bodily endwise in an unalined condition to transmit the action of the clutch-thrower to the clutch.

6. Starting and stopping mechanism having, in combination, a clutch, a clutch-thrower, relatively movable transmission pieces between said clutch and clutch-thrower, a latch for engaging the transmission pieces at separate points to hold them so that they may be moved bodily endwise in an unalined condition to transmit the action of the clutch-thrower to the clutch, and means for moving said transmission pieces into a further unalined position to interrupt effective communication therethrough.

7. Starting and stopping mechanism having, in combination, a clutch, a clutch-thrower, toggle links interposed between said clutch and clutch-thrower, means mounted on one link and acting on the other link to prevent its angular movement in either direction while the links are transmitting the action of said clutch-thrower to said clutch, and means for releasing said link.

8. Starting and stopping mechanism having, in combination, a clutch, a clutch-thrower, toggle links interposed between said clutch and clutch-thrower, and a latch pivoted to one of said links, said latch being arranged to engage the other link and lock both links against relative angular movement whereby the links are adapted for transmitting the action of the clutch-thrower, and means for tripping said latch.

9. Mechanism for shifting the friction member of a clutch including a pair of links pivoted end to end, a latch on one link, a coöperating catch piece on the other link, and a spring for causing said latch to engage and lock the links in a predetermined position.

10. Mechanism for shifting the friction member of a clutch including a pair of links pivoted together, adjustable means for determining the relative angular position of said links, a spring for holding said links normally in such position, a latch pivoted to one of said links, a spring tending normally to swing said latch into locking engagement with the other link, and a treadle rod arranged to act in opposition to said latter spring.

In testimony whereof I have signed my name to this specification in the presence of two subscribing witnesses.

FRED. L. MacKENZIE.

Witnesses:
HERBERT W. KENWAY,
FREDERICK L. EDMANDS.

Copies of this patent may be obtained for five cents each, by addressing the "Commissioner of Patents, Washington, D. C."